(12) United States Patent
Johnson

(10) Patent No.: US 9,430,258 B2
(45) Date of Patent: Aug. 30, 2016

(54) EFFICIENT SHARING OF IDENTICAL GRAPHICS RESOURCES BY MULTIPLE VIRTUAL MACHINES USING SEPARATE HOST EXTENSION PROCESSES

(71) Applicant: VMware, Inc., Palo Alto, CA (US)

(72) Inventor: Stephen P. Johnson, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 554 days.

(21) Appl. No.: 13/891,878

(22) Filed: May 10, 2013

(65) Prior Publication Data

US 2014/0337835 A1 Nov. 13, 2014

(51) Int. Cl.
G06F 9/455 (2006.01)
G06F 17/30 (2006.01)

(52) U.S. Cl.
CPC ....... *G06F 9/45533* (2013.01); *G06F 9/45558* (2013.01); *G06F 17/30* (2013.01); *G06F 2009/45579* (2013.01); *G09G 2370/022* (2013.01)

(58) Field of Classification Search
None
See application file for complete search history.

(56) References Cited

U.S. PATENT DOCUMENTS

| | | | |
|---|---|---|---|
| 5,446,901 A * | 8/1995 | Owicki | G06F 12/0253 711/154 |
| 7,830,388 B1 * | 11/2010 | Lu | G06T 15/005 345/418 |
| 2005/0210158 A1 | 9/2005 | Cowperthwaite et al. | |
| 2009/0305790 A1 * | 12/2009 | Lu | A63F 13/12 463/42 |
| 2010/0138744 A1 * | 6/2010 | Kamay | G06F 9/4445 715/716 |
| 2010/0306306 A1 * | 12/2010 | Kamay | G06F 9/45558 709/203 |
| 2010/0329572 A1 * | 12/2010 | Kamay | G06F 3/1454 382/209 |
| 2011/0210972 A1 * | 9/2011 | Tsirkin | G06F 3/14 345/428 |
| 2012/0084774 A1 * | 4/2012 | Post | G09F 9/5088 718/1 |
| 2014/0055466 A1 * | 2/2014 | Petrov | G06F 9/45533 345/520 |
| 2014/0122659 A1 * | 5/2014 | Kaul | G06F 9/4445 709/219 |

OTHER PUBLICATIONS

Notification of Transmittal of the International Search Report and the Written Opinion of the International Searching Authority, or the Declaration, International Search Report mailed Aug. 8, 2014, Written Opinion of the International Searching Authority, International Application No. PCT/US2014/037564 filed May 9, 2014, pp. 1-10.

\* cited by examiner

*Primary Examiner* — Benjamin Wu

(57) ABSTRACT

Graphics resources are shared among a plurality of virtual machines (VMs) running on a host. In one embodiment, a request to create a graphics resource is received from a first VM, the request including a graphics object ID corresponding to the graphics resource to be created. A resource key is generated based on content of the graphics resource and an association is maintained between the graphics object ID and the resource key. If an identical graphics resource does not currently reside in the host graphics memory, a command is sent to the host GPU driver to store the graphics resource in the host graphics memory, but when an identical graphics resource resides in the host graphics memory, the graphics resource is not stored in the host graphics memory. Instead, the identical graphics resource is shared by the first VM and at least one other VM.

14 Claims, 3 Drawing Sheets

EFFICIENT SHARING OF IDENTICAL GRAPHICS RESOURCES BY MULTIPLE VIRTUAL MACHINES USING SEPARATE HOST EXTENSION PROCESSES

BACKGROUND

Virtual machines (VMs) running on a physical host may use a graphics processing unit (GPU) to perform graphics operations. Virtualization software manages the use of the GPU by the VMs. Each VM runs a guest operating system, which may be a commodity operating system such as Microsoft Windows or Linux, and various virtual devices are presented to the guest operating system by the underlying virtualization software. For example, the virtualization software may present virtual peripheral component interconnect (VPCI) devices to the guest operating system where one of the VPCI devices includes a virtual GPU (or "VGPU"). The VGPU, therefore is a software abstraction of a physical GPU device; the functionality of the VGPU is defined by software routines that form part of the virtualization software as well as any physical devices, such as physical, or host GPUs (or "HGPUs") and associated drivers, that support the VGPU operation. Virtualization software can be viewed as a layer of indirection, wherein VGPU requests from the VM are received by the virtualization software and redirected to an HGPU, which might also be shared by a number of VMs in a manner that is transparent to each of the VMs.

VGPUs process software function calls from the guest operating system to perform graphics operations using graphics resources. The graphics operations include clearing the display, setting the display mode, rendering a scene, or playing a video frame. The software function calls are directed to VGPU resources that are mapped to HGPU function calls by a process referred to herein as an extended virtual machine (VMX). Typically, each VM running on a host has a corresponding VMX process.

Before using a graphics resource, a VM SVGA guest driver first stores the contents for the graphics resource in guest memory of the VM and sends a "create" graphics object command and a unique graphics object ID to the VGPU. In response to the command from the VM, the VMX process then passes the resource to the HGPU driver which stores the content for the graphics resource in host HGPU memory associated with the HGPU. For example, the virtual machine may use a texture, which applies detail to an item, or a shader, which is a program that is executable by the HGPU for applying rendering effects. The HGPU driver stores image data for the texture or byte code for the shader, along with associated meta data, in HGPU memory for use by the VMs when needed.

Multiple VMs running on the host may use identical graphics resources. For example, multiple VMs may be running the same operating system, which might use the same textures and shaders. However, VMs are generally isolated from one another and do not know which graphics resources are being used by other VMs. Thus, each VM may store content for identical graphics resources in their guest memory. The VMX processes each direct the graphics resources to the HPGU driver which copies the contents for the identical graphics resources in host HGPU memory. Thus, redundant content can be stored in the HGPU memory.

SUMMARY

Graphics resources are shared among a plurality of virtual machines (VMs) running on a host. In one embodiment, a request to create a graphics resource is received from a first VM, the request including a graphics object ID corresponding to the graphics resource to be created. A resource key is generated based on content of the graphics resource and an association is maintained between the graphics object ID and the resource key. If an identical graphics resource does not currently reside in the host graphics memory, a command is sent to the host GPU driver to store the graphics resource in the host graphics memory, but when an identical graphics resource resides in the host graphics memory, the graphics resource is not stored in the host graphics memory. Instead, the identical graphics resource is shared by the first VM and at least one other VM.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
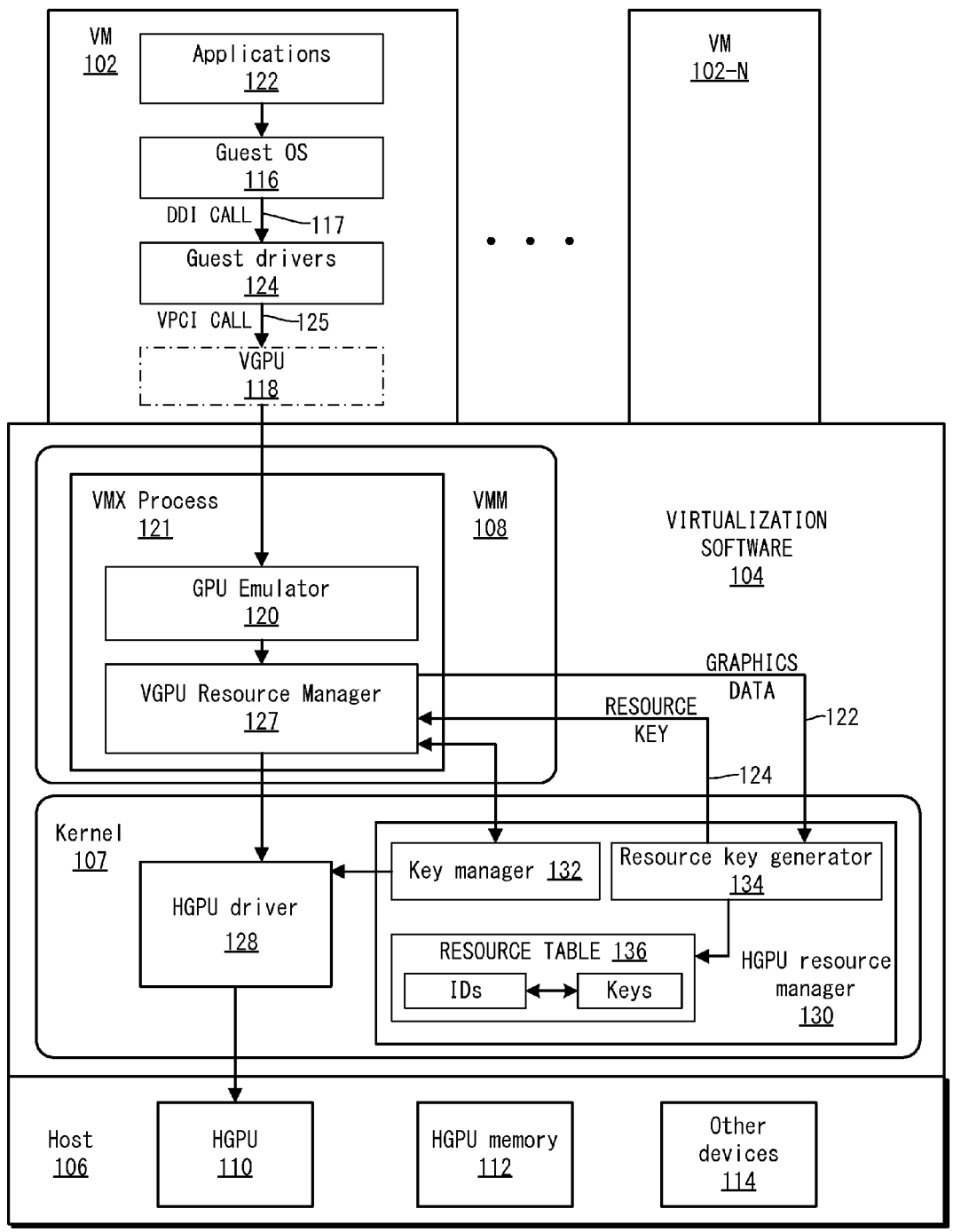
FIG. 1 is a block diagram of an exemplary computer system and components for processing graphics operations.

FIG. 1 is a block diagram of an exemplary computer system and components for processing graphics operations. A plurality of virtual machines (VMs) 102-102-N are abstracted by virtualization software 104 running on a physical host 106. In various embodiments, virtualization software comprises a kernel component 107 which manages physical resources of host 106 and, for each VM running on host 106, an instance of a virtual machine monitor (VMM) 108 (only one shown), which provides an interface between guest code executing in VM 102, and the kernel. Host 106 includes physical devices including a host graphics processing unit (HGPU) 110, host GPU memory 112, and various other devices 114, such as processors, memory, and disk storage. Each VM 102 includes a guest operating system 116, which may be a commodity operating system such as Microsoft Windows or Linux, and virtual devices, which include a virtual GPU (VGPU) 118. For the sake of simplicity, no other virtual devices aside from VGPU 118 are shown in FIG. 1, although each VM may have a variety of virtual devices including virtual disks, guest physical memory, virtual network interfaces, etc. VGPU 118 is shown with a dashed boundary to indicate that it is a software abstraction of a physical device, and while it is conceptually part of VM 102, it is actually implemented using GPU emulator 120, which comprises software routines that reside in virtualization software 104.

Guest software, including guest applications 122 and guest operating system 116 may perform graphics operations. The guest software sends software function calls for the graphics operations to VGPU 118 through guest drivers 124. For example, device driver interface (DDI) calls that use VGPU resources and are sent to VGPU 118. A virtual machine extension (VMX) process 121 receives the calls and manages HGPU resources for VM 102. For example, VMX process 121 validates the function calls, initializes a connection with an HGPU driver 128 for processing of the graphics operations, and translates the calls from VM 102 into calls for HGPU driver 128. HGPU driver 128 may be an unmodified GPU driver which operates in accordance with standard GPU driver functionality, which includes forwarding the operations to HGPU 110 to have the graphics operations performed. It should be recognized that, while FIG. 1 shows by way of example one particular virtualization configuration, the components and methods described herein may be adapted for other virtualization configurations. For example, HGPU driver 128, and resource manager 126 may reside in a special VM (sometimes referred to as "Domain 0" or a "root partition") that has direct access to physical devices rather than in the kernel 107 or VMM 108. The term, "virtualization software" will include any software that effectuates machine virtualization regardless as to where it resides.

As will be described in more detail below, a graphics resource may be stored in HGPU memory 112 and shared by multiple VMs 102. Thus, even though multiple virtual machines 102 have separately created identical graphics resources, these separate graphics resource instances may be consolidated in HGPU memory 112. For example, once a graphics resource is stored in HGPU memory 112 for a first virtual machine 102, the graphics resource may be recognized as having already been stored in HGPU memory 112 when a second virtual machine 102 creates or performs other graphics operations with an identical graphics resource. In this way, the graphics content may be shared between first and the second virtual machines 102.

The term "graphics resource" is a general term for a graphics object such as a vertex buffer, index buffer, render target, texture, shader source or shader constant. The graphics resource may include graphics content and metadata that describes the graphics content. For example, graphics content can include texel data for a texture, pixel data for a render target, floating point numbers in a vertex buffer or byte code (the bytes representing instructions) in a shader. Metadata may include a width, a height, a format, a numerical format (integer, float, type list) for the graphics content. For a texture, the metadata may encode the width, height, pixel format, bytes per row, number of MIP levels, and a number of cube faces. The metadata for a shader object includes the type of shader (e.g., geometry, vertex, or pixel), the version of the shader source code, and a number of bytes in the shader.

Each VM 102, or multiple ones of VMs 102, may be using identical graphics resources. For example, the graphical display for a user interface generated by guest operating system 116 may include the same buttons, window borders, backgrounds, and textures. Each of these objects may be represented by a graphics resource in the HGPU memory 112. Each VM 102 that has the same guest operating system or guest software may therefore store identical graphics resources in guest memory. To conserve memory and allow a greater number of VMs to utilize HGPU resources without relying on software rendering of graphics commands, the graphics resources stored by one VM may be shared with another VM that needs an identical resource.

Particular embodiments use VGPU resource manager 127 and HGPU resource manager 130 to manage a resource key that uniquely identifies a graphics resource. In one embodiment, HGPU resource manager 130 computes the resource key based on contents of the graphics resource. For example, content from the graphics resource may be input into a hash algorithm for computing the resource key. The resource key may be computed from all content of the graphics resource, or from only specific content, e.g., the graphics content (excluding meta data) of the graphics resource. Any subset of the content of the graphics resource sufficient to uniquely identify the graphics resource may be used. Because the resource key is computed based on the content, graphics resources that include the same content will have the same resource key computed. Conversely, graphics resources that include different content should have a different resource key computed. This allows particular embodiments to identify when virtual machines 102 are using identical graphics resources.

When an application 122 wants to perform a graphics operation, it calls a library function of guest OS 116, which in turn performs a device driver interface (DDI) call 117 to manage memory resources. Guest drivers 124, such as a SVGA graphics driver, will translate these calls into VPCI calls 125 to VGPU 118. As mentioned above, VGPU is an abstraction of a physical device that is provided to VM 102 by GPU emulator 120. From the perspective of guest software executing within virtual machine 102, VGPU behaves as a physical device present within the context of the virtual machine. However, the functionality of VGPU is implemented by code within GPU emulator 120. Therefore, VMX process 121 processes VCPI call 125 using GPU emulator 120.

Figure 2:
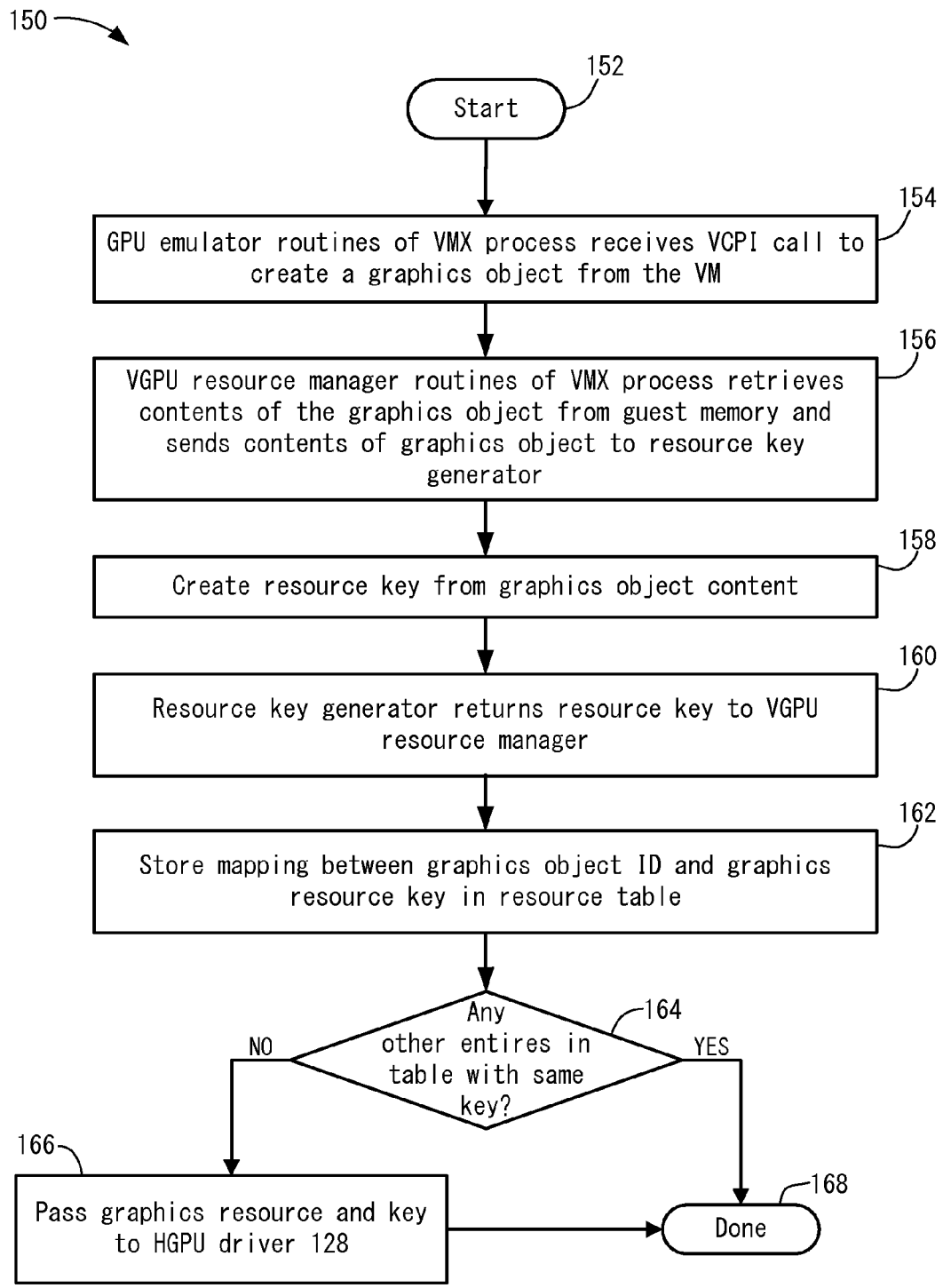
FIG. 2 shows a flowchart illustrating an exemplary procedure that may be performed when a VM creates a graphics resource.

FIG. 2 shows a flow chart 150 illustrating by way of example a process for redirecting VCPI calls received from a VM to HGPU driver 128. The process begins as indicated by start block 152. In operation 154, the VMX process receives a VCPI call to create a graphics resource. In one example, an SVGA guest driver sends a "create" graphics object command via VCPI to the VGPU 118, which is received by VMX process 121. The SVGA guest driver sends with the VCPI call a unique ID for the graphics object and a location in guest memory for the contents of the graphics object. The graphics object ID is unique from the VM's perspective in that the VM SVGA graphics guest driver generates it along with the meta data and graphics content. Once guest driver 124 sends VGPU 118 the command to create the graphics object, it can use the graphics object ID as a handle to reference the created graphics object in subsequent graphics commands such as draw triangle or copy pixel data.

In operation 156, VGPU resource manager 127 retrieves the contents of the graphics object and sends content (or a pointer to content) for the graphics object received from the VM to resource key generator 134 of HGPU resource manager 130 as shown in FIG. 1 by arrow 122. In operation 158, resource key generator 134 uses content from the graphics resource to generate the resource key. Resource key generator 134 may use a hash algorithm to generate the resource key from all or part of the graphics object contents so that identical resources will have identical keys. For example, the hash algorithm receives or otherwise accesses a series of bytes of content from the graphics resource and generates a unique number corresponding to those bytes. With typical hash algorithms, there is no guarantee that two different graphics resources will not be mapped to the same hash value such that resource key collisions are possible, but extremely unlikely. Thus, the resource key is considered "substantially unique" to the graphics resource. In one embodiment, HGPU resource manager 126 generates a 64-bit resource key; however, other types of resource keys may be generated. Also, other algorithms that can generate guaranteed unique keys from content may be used. The term, "substantially unique" will be used herein to broadly refer to resource keys generated by both guaranteed unique hash algorithms, and hash algorithms without such guarantees.

In one example, resource key generator 134 may be a library function that inputs graphics object content and generates a 64-bit or 128 bit number. In operation 160, resource key generator 134 then returns the resource key to VGPU resource manager 127.

In operation 162, resource table 136 is updated with a mapping that associates the graphics object ID received from the VM 102 with the graphics resource ID generated by resource key generator 134. In one embodiment, this mapping is created by resource key generator 134 when the resource key is generated, but it is also possible to perform this operation using key manager 132 in response to a command from VGPU resource manager 127.

In operation 164, it is determined whether there are any other entries in resource table 136 with identical resource keys. For example, VGPU resource manager 127 may send a command to key manager 132 which consults resource table 136 and returns an appropriate response depending on whether any other entries having the same resource key exist. Because the resource table is common for all (or multiple) VMs 102 on host 106, if the table does not contain any other entries with the same resource key, then the graphics object has not been used before by the VMs. In an alternate embodiment, a count of the number of VMs sharing each graphics resource is maintained which can be consulted to determine whether any other resources are shared. Therefore, when the count for the graphics resource is zero, or the resource table has no other entries with the same resource key, the procedure flows to operation 166, wherein the graphics resource, along with the resource key, is passed to HGPU driver 128, which stores the graphics resource and resource key in HGPU memory 112. The procedure then ends as indicated by done block 168.

If, at operation 164, it is determined that the of the number of VMs using a graphics resource is greater than zero, or another entry having an identical resource key exists in resource table 134, then the graphics resource is not sent to HGPU driver 128 and the procedure ends as indicated by done block 168. In this way, virtualization software 104 avoids storing identical graphics resources in HGPU memory 112.

Figure 3:
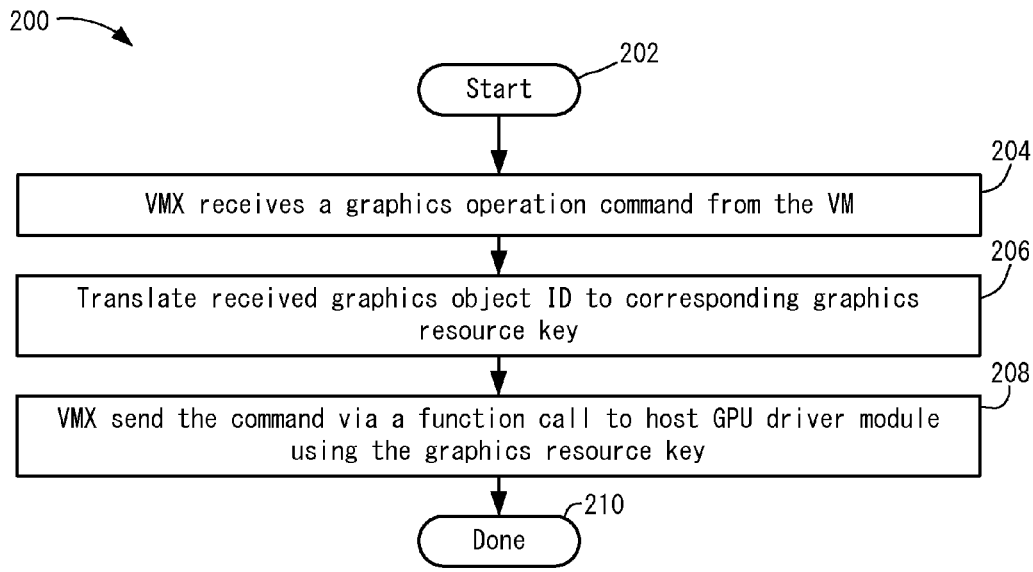
FIG. 3 shows a flowchart illustrating an exemplary method for performing a graphics operation with a shared graphics resource.

Once a VM creates a graphics object using the "create" command, subsequent commands may be issued by the VM that use the previously-created object in various ways. FIG. 3 shows a flowchart 200 illustrating an exemplary procedure that may be performed each time virtual machine 102 uses a graphics object. The procedure begins as indicated by "start" block 202 when the VM issues a graphics command. In operation 204, VMX process 121 receives a command to perform a graphics operation using the graphics resource previously stored in HGPU memory. For example, the command may use a shader or render using a texture. The VM will include in the command the graphics object ID of the object used by the command.

In operation 206, VMX process translates the graphics object ID received with the command from VM 202 to the corresponding graphics resource key previously generated as described above with reference to FIG. 2. For example VGPU resource manager may send a request for translation of the received graphics object ID to key manager 132 which searches resource table 136 for the resource key that matches the object ID, and returns the resource key to VGPU resource manager 127.

At operation 208, VMX process 121 sends the command, or a corresponding command, with the graphics resource key that corresponds to the received graphics object ID, via a function call to host GPU driver 128. The procedure ends, as indicated by done block 210. In accordance with standard operation of GPU drivers generally, HGPU driver 128 receives the graphics resource key and uses graphics resource corresponding to the graphics resource key to process the graphics command.

Figure 4:
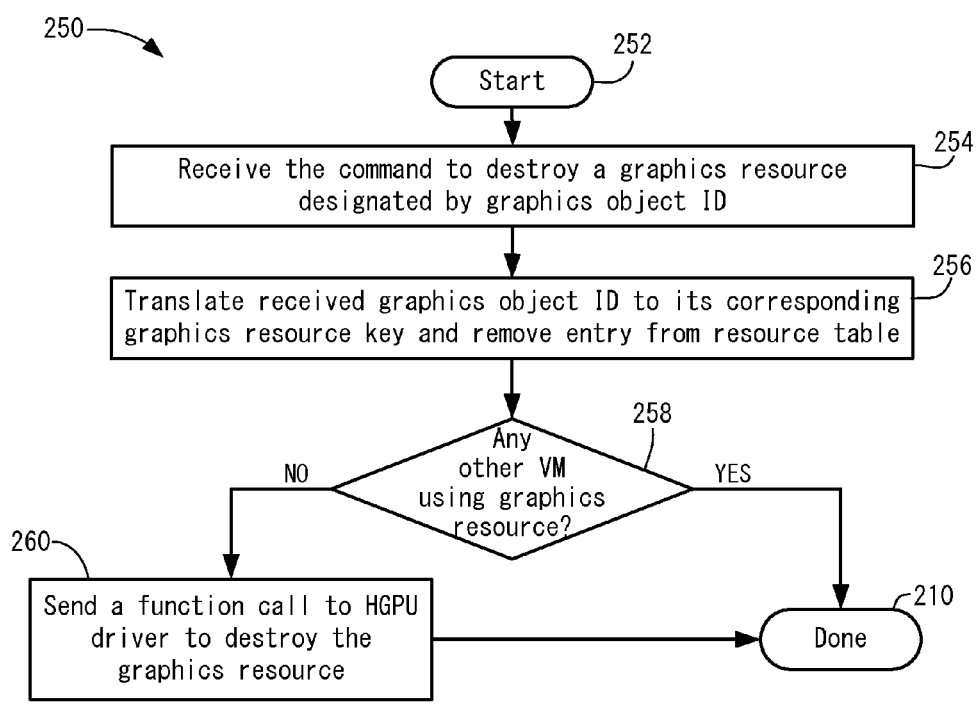
FIG. 4 shows a flowchart illustrating a method for destroying the graphics resource ID according to one embodiment.

The graphics resource and associated key (or ID) may be destroyed when no virtual machines 102 are using the graphics resource anymore. Thus, when each virtual machine 102 finishes using a graphics resource, virtual machine 102 sends a request to destroy the graphics resource. FIG. 4 shows a flowchart 250 illustrating a procedure for destroying the graphics resource according to one embodiment. The procedure begins as indicated by start block 252 when VM 102 sends a request to destroy the graphics resource. In operation 254, VMX process 121 receives the command from VM 102 to destroy the graphics resource identified with the VM's object ID for the graphics resource it wishes to destroy. In operation 256, VMX process translates the received object ID to its corresponding graphics resource key as described above with reference to operation 206, and removes the corresponding entry from resource table 136. In operation 258, VMX process 121 determines whether any other VM is still using the graphics resource. In one embodiment, resource manager 126 uses a counter (not shown) for each graphics resource to tracks the number of VMs using each resource.

For example, a counter value maintained for each shared resource may be incremented each time the corresponding graphics resource is created by a VM and decremented each time a VM destroys the graphics resource. The counter therefore provides an indication of how many VMs share each resource. These counters can also be useful in providing resource sharing metrics to an administrator user or management entity when assessing a load on graphics resources. Such an assessment might be used when determining how to distribute VMs across a number of hosts. In another embodiment, resource table 136, which contains an entry that associates an object ID from each VM to a commonly-used graphics object, is searched to determine if any entries exist that have the same resource key as returned in translation operation 256.

If, at operation 258 it is determined that no other VMs are using the graphics resource, then the procedure flows to operation 260, wherein a command is sent to HGPU driver 128 to destroy the graphics resource, which the command identifies using the resource key. The procedure then ends as indicated by done block 210. If, in operation 258, it is determined that at least one other VM is still using the same graphics resource as corresponding to the request received in operation 254, then the graphics resource is not destroyed and the procedure ends as indicated by done block 210.

When a command is sent to HGPU driver 128 to destroy a graphics resource, in accordance with standard GPU behavior, the memory allocated to the graphics resource in HGPU memory 112 is released. Once released, the areas of memory previously assigned to the destroyed graphics resource can be used for other graphics resources or other data.

Graphics resources may be modified after they are created. For example, guest driver 124 may need to update the contents of a graphics resource. In one embodiment, when a request to update a graphics resource is received, VMX process 202 or HGPU resource manager 130 checks to determine if the previous graphics content was shared among multiple virtual machines 102, and if not, generates a new graphics resource key for the new graphic resource contents using HGPU resource manager 130, destroys the old graphics resource by sending a command to HGPU driver 128 and creates a new graphics resource with the modified contents and the new graphics resource key. In one embodiment, HGPU resource manager 130 may assume that the new graphics resource may be shared as was the case with the old graphics resource. In this case, VMX process 121 may check to see if any other VMs have created an identical modified graphics resource as described above with reference to FIG. 2.

If the graphics resource, prior to the modification, was shared by at least one other VM, then the table entry establishing the translation from the received object ID to the resource key is removed from resource table 136 and the newly generated resource key and corresponding object ID is stored in resource table 136. If the modified graphics resource is not already used by any other VMs, then it is created by calling a function in HGPU driver 128 to store the modified graphics resource to HGPU memory 112. The current VM 102 may then use the updated graphics resource where the updated graphics content is stored in HGPU memory 112.

By sharing graphics resources, HGPU memory is conserved, which can allow the GPU resources to support more VMs, when HGPU memory is a limiting factor. Furthermore, by using shared HGPU resources, multiple VMs will access the same areas of HGPU memory thereby providing locality of memory references resulting in improved performance. For shaders where there is an expensive (in terms of processor cycles) compile step in the HGPU drivers, the compiling of duplicate shader code is avoided, providing greater host CPU performance and increased shader instruction cache locality. For Windows 7 and Windows 8, the guest rendering environment uses the same graphics resource over and over many times. Without using the techniques described herein, the resource is duplicated in the HGPU, wasting precious host resources. Since the VMX process has to copy the resource data anyway, the added expense of computing the resource key is very small.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion. In another embodiment, code for implementing functionality described herein may be transmitted, e.g., from a server to a client, wherein the client can then execute the code.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for sharing graphics resources among a plurality of virtual machines (VMs) running on a host, the method comprising:
   receiving a request to create a graphics resource from a first VM of the plurality of VMs, the request including a graphics object ID corresponding to the graphics resource to be created;
   generating a resource key based on content of the graphics resource, the resource key being substantially unique to the graphics resource;
   maintaining an association between the graphics object ID and the resource key;
   determining whether an identical graphics resource, previously created by another VM of the plurality of VMs, currently resides in a host graphics memory;
   when no identical graphics resource currently resides in the host graphics memory, sending a command to a host GPU driver to store the graphics resource in the host graphics memory; and
   when an identical graphics resource currently resides in the host graphics memory, preventing the graphics resource from being stored in the host graphics memory, wherein the identical graphics resource is shared by the first VM and at least one other VM,
   wherein each of the plurality of virtual machines is associated with a separate virtual machine extension (VMX) process of virtualization software running on the host, and wherein each VMX process communicates with a resource key generator to obtain the resource key for the graphics resource.

2. The method of claim 1, wherein:
   the maintaining of the association between the graphics object ID and the resource key comprises adding an entry to a table that associates graphics object IDs received from VMs to corresponding resource keys; and
   the determining of whether an identical graphics resource currently resides in the host graphics memory comprises searching the table for another entry having an identical resource key.

3. The method of claim 1, wherein the resource key is computed based on only graphics content of the graphics resource.

4. The method of claim 1, further comprising:
   receiving an indication that the first VM is no longer using the graphics resource;
   removing the association between the object ID of the graphics resource and the resource key;
   determining whether any other of the VMs are using the graphics resource; and
   causing the graphics memory allocated for storing the graphics resource to be released when and only when no other VMs are sharing the graphics resource.

5. The method of claim 1, wherein the resource key is generated using the resource key generator of the virtualization software and outside a context of a virtual machine monitor.

6. A non-transitory computer-readable storage medium containing program instructions for sharing graphics resources among a plurality of virtual machines (VMs) running on a host, wherein execution of the program instructions by one or more processors of a computer system causes the one or more processors to perform steps comprising:
   receiving a request to create a graphics resource from a first VM of the plurality of VMs, the request including a graphics object ID corresponding to the graphics resource to be created;
   generating a resource key based on content of the graphics resource, the resource key being substantially unique to the graphics resource;
   maintaining an association between the graphics object ID and the resource key;
   determining whether an identical graphics resource, previously created by another VM of the plurality of VMs, currently resides in a host graphics memory;
   when no identical graphics resource currently resides in the host graphics memory, sending a command to a host GPU driver to store the graphics resource in the host graphics memory; and
   when an identical graphics resource currently resides in the host graphics memory, preventing the graphics resource from being stored in the host graphics memory, wherein the identical graphics resource is shared by the first VM and at least one other VM,
   wherein each of the plurality of virtual machines is associated with a separate virtual machine extension (VMX) process of virtualization software running on the host, and wherein each VMX process communicates with a resource key generator to obtain the resource key for the graphics resource.

7. The system non-transitory computer-readable storage medium of claim 6, wherein:
   the maintaining of the association between the graphics object ID and the resource key comprises adding an entry to a table that associates graphics object IDs received from VMs to corresponding resource keys; and
   the determining of whether an identical graphics resource currently resides in the host graphics memory comprises searching the table for another entry having an identical resource key.

8. The non-transitory computer-readable storage medium of claim 6, wherein the resource key is computed based on only graphics content of the graphics resource.

9. The non-transitory computer-readable storage medium of claim 6, wherein the steps further comprise:
   receiving an indication that the first VM is no longer using the graphics resource;
   forgetting the association between the object ID of the graphics resource and the resource key;
   determining whether any other of the VMs are using the graphics resource; and
   causing the graphics memory allocated for storing the graphics resource to be released when and only when no other VMs are sharing the graphics resource.

10. The non-transitory computer-readable storage medium of claim 6, wherein the resource key is generated using the resource key generator of the virtualization software and outside a context of a virtual machine monitor.

11. A method for causing a computer system to share graphics resources among a plurality of virtual machines (VMs) running on the computer system, the method comprising:

transmitting code for receiving a request to create a graphics resource from a first VM of the plurality of VMs, the request including a graphics object ID corresponding to the graphics resource to be created;

transmitting code for generating a resource key based on content of the graphics resource, the resource key being substantially unique to the graphics resource;

transmitting code for maintaining an association between the graphics object ID and the resource key;

transmitting code for determining whether an identical graphics resource, previously created by another VM of the plurality of VMs, currently resides in a host graphics memory;

transmitting code for sending a command to a host GPU driver to store the graphics resource in the host graphics memory if no identical graphics resource currently resides in the host graphics memory; and transmitting code for preventing the graphics resource from being stored in the host graphics memory if an identical graphics resource currently resides in the host graphics memory, wherein the identical graphics resource is shared by the first VM and at least one other VM, wherein each of the plurality of virtual machines is associated with a separate virtual machine extension (VMX) process of virtualization software running on the computer system, and wherein each VMX process communicates with a resource key generator to obtain the resource key for the graphics resource.

12. The method of claim 11, wherein:

the maintaining of the association between the graphics object ID and the resource key comprises adding an entry to a table that associates graphics object IDs received from VMs to corresponding resource keys; and the determining of whether an identical graphics resource currently resides in the host graphics memory comprises searching the table for another entry having an identical resource key.

13. The method of claim 11, wherein the resource key is computed based on only graphics content of the graphics resource.

14. The method of claim 11, further comprising:

transmitting code for receiving an indication that the first VM is no longer using the graphics resource;

transmitting code for deleting the association between the object ID of the graphics resource and the resource key;

transmitting code for determining whether any other of the VMs are using the graphics resource; and transmitting code for causing graphics memory allocated for storing the graphics resource to be released when and only when no other VMs are sharing the graphics resource.

* * * * *